(12) United States Patent
Kastner et al.

(10) Patent No.: US 9,840,439 B2
(45) Date of Patent: Dec. 12, 2017

(54) ULTRA-HIGH PERFORMANCE CONCRETE AND CONCRETE COMPONENT PRODUCED THEREFROM

(71) Applicant: Europoles GmbH & Co. KG, Neumarkt (DE)

(72) Inventors: Roland Kastner, Sengenthal (DE); Helmut Lieb, Neumarkt (DE); Frank Dittmar, Neumarkt (DE); Jianxin Ma, Magdeburg (DE)

(73) Assignee: EUROPOLES GMBH & CO. KG, Neumarkt (DE)

( * ) Notice: Subject to any disclaimer, the term of this patent is extended or adjusted under 35 U.S.C. 154(b) by 257 days.

(21) Appl. No.: 14/460,722

(22) Filed: Aug. 15, 2014

(65) Prior Publication Data

US 2015/0047533 A1 Feb. 19, 2015

(30) Foreign Application Priority Data

Aug. 15, 2013 (DE) .................. 10 2013 108 836

(51) Int. Cl.

| | | |
|---|---|---|
| *C04B 7/02* | (2006.01) | |
| *C04B 28/04* | (2006.01) | |
| *B28B 1/20* | (2006.01) | |
| *C04B 14/48* | (2006.01) | |
| *C04B 16/06* | (2006.01) | |
| *C04B 111/56* | (2006.01) | |

(52) U.S. Cl.
CPC ................ *C04B 28/04* (2013.01); *B28B 1/20* (2013.01); *C04B 14/48* (2013.01); *C04B 16/0633* (2013.01); *C04B 2111/56* (2013.01); *C04B 2201/52* (2013.01)

(58) Field of Classification Search
CPC .................................. C04B 7/02; C04B 28/04
See application file for complete search history.

(56) References Cited

U.S. PATENT DOCUMENTS

| | | | | |
|---|---|---|---|---|
| 3,366,720 A | * | 1/1968 | Burger | ................... C04B 28/02 106/716 |
| 3,389,003 A | * | 6/1968 | Gado | .................. C04B 22/0086 106/717 |
| 3,945,782 A | * | 3/1976 | Farahar | ..................... F16L 9/08 425/127 |
| 4,023,706 A | * | 5/1977 | Dearlove | ................ B28C 5/404 106/644 |
| 5,584,926 A | * | 12/1996 | Borgholm | ................ C04B 7/00 106/713 |

(Continued)

FOREIGN PATENT DOCUMENTS

| | | |
|---|---|---|
| CN | 102199021 A * | 9/2011 |
| DE | 202005003095 U1 | 2/1985 |
| DE | 10332491 B4 | 2/2005 |

OTHER PUBLICATIONS

CN 102199021 A Machine Translation into English Sep. 28, 2011 Wang.*

(Continued)

*Primary Examiner* — Paul Marcantoni
(74) *Attorney, Agent, or Firm* — Lucas & Mercanti, LLP

(57) ABSTRACT

Ultra-high performance concrete produced from cement, aggregate, water, fillers, and additives, wherein the aggregate comprises 800-1,300 kg of an igneous rock in the form of crushed stone per cubic meter of concrete.

15 Claims, 1 Drawing Sheet

(56) References Cited

U.S. PATENT DOCUMENTS

| | | | | |
|---|---|---|---|---|
| 6,080,234 | A | * | 6/2000 | Clavaud .................. C04B 28/02 106/640 |
| 6,432,532 | B2 | * | 8/2002 | Perez ........................... 428/359 |
| 6,630,022 | B2 | * | 10/2003 | Lessard ..................... C04B 7/12 106/401 |
| 9,090,508 | B2 | * | 7/2015 | Gong .................... C04B 28/006 |
| 2014/0060388 | A1 | * | 3/2014 | Sadiq ..................... B82Y 30/00 106/644 |

OTHER PUBLICATIONS

"Schleuderbetonstützen aus hochfester Bewehrung und ultrahochfestem Beton", published 2012.
"Entwicklung, Dauerhaftigkeit und Berechnung Ultrahochfester Betone (UHPC)", published 2005.

* cited by examiner

ULTRA-HIGH PERFORMANCE CONCRETE AND CONCRETE COMPONENT PRODUCED THEREFROM

The present application claims priority of DE 10 2013 108 836.8, filed Aug. 15, 2013, the priority of this application is hereby claimed and this application is incorporated herein by reference.

BACKGROUND OF THE INVENTION

The invention pertains to an ultra-high performance concrete produced essentially from cement, aggregate, water, fillers, and additives. The term "ultra-high performance concrete" is also used in this application for the associated concrete mix from which the concrete is produced.

When prefabricated components are used in building construction, normal concrete of strength classes C40/50-C60/75, for example, together with reinforcement of grade B500B (normal steel), is usually used. Higher-strength concretes up to strength class C100/115 are used for certain applications in the area of slender columns and highly stressed bridge components. Steel composite columns are often used for structures with very slender or highly loaded columns such as those found in parking garages, business towers, and hotel towers, for example, or for conspicuous public buildings. Nevertheless, these suffer from the disadvantage that a very large amount of steel is required, and in addition this large amount of steel leads to considerable production costs.

A concrete with a compressive strength of at least 140 $N/mm^2$ is usually designated an "ultra-high performance concrete" (UHPC).

In addition, self-compacting concrete (SCC) and form-vibrated concrete are also known.

The previously developed ultra-high performance concretes (UHPCs) are used only rarely in practice, because these concrete mixes are extremely expensive; typically, the cost is about 10 times that of normal concrete. Conventional ultra-high performance concrete contains very expensive fillers and additives, among other things, which results in the high price. In addition, these fillers or additives must be screened with extremely high precision in order to achieve a high density (bulk density).

A disadvantage of working with ultra-high performance concrete is its stickiness, which means that it cannot be pumped in the conventional way. It is therefore usually introduced into the form by hand, which increases the amount of processing work.

SUMMARY OF THE INVENTION

The invention is therefore based on the goal of providing an ultra-high performance concrete which can be produced at low cost and is easy to process.

To achieve this goal in the case of an ultra-high performance concrete of the type described above, it is provided according to the invention that the aggregate comprises 800-1,300 kg of an igneous rock in the form of crushed stone per cubic meter of concrete.

The invention is based on the realization that a low-cost, ultra-high performance concrete can be produced when, instead of the previously used, very expensive chemical admixtures, an igneous rock in the form of crushed stone is used as hard aggregate. This material is obtainable at low cost and is available practically everywhere. The crushed stone can be quarried near the production site, which means that there is no need for long and thus expensive transport operations.

The igneous rock is preferably a volcanic rock, preferably basalt and/or andesite and/or trachyte.

Alternatively or in addition, the igneous rock can also comprise abyssal rock (plutonite), preferably granite and/or diorite and/or syenite.

Of course, a mixture of volcanic rock and plutonite can also be used. Gneiss can also be present.

The igneous rock is used in processed form, i.e., after it has been processed into crushed stone of a defined grain size. The invention is based on the fact that, in spite of the broken materials processed into crushed stone, the concrete mix can still be handled and processed, because the grading curve of the admixtures (fillers and additives) is of a similar, compatible type.

The ultra-high performance concrete preferably contains crushed stone, especially crushed basalt, with a grain size of 0-8 mm.

Additives can be present at a rate of ≥5% of the cement mass.

In the ultra-high performance concrete according to the invention, it is preferred that one cubic meter of concrete or of the associated concrete mix contain 450-650 kg of cement. The exact quantity can be varied within these limits as a function of the desired properties.

It also lies within the scope of the invention that one cubic meter of the ultra-high performance concrete according to the invention or of the associated concrete mix contains 120-160 kg of water. The exact quantity of the water added lies between these limit values.

One cubic meter of the ultra-high performance concrete according to the invention or of the associated concrete mix preferably contains 500-1,000 kg of sand.

60-100 kg of microsilica powder per cubic meter of the ultra-high performance concrete or of the associated concrete mix can be added if desired. The addition of the microsilica powder has the effect of improving the properties of the concrete produced and also its processability.

It is also possible to add 50-200 kg of quartz powder per cubic meter to the ultra-high performance concrete or to the associated concrete mix. Polypropylene microfibers in a quantity of 0.5-2.5 kg per cubic meter can also be added to the concrete.

Optionally, additives in a proportion by weight of less than 5% can also be added to the ultra-high performance concrete according to the invention or to the associated concrete mix. The additives can comprise liquefiers in particular.

The ultra-high performance concrete according to the invention is characterized in that it has a compressive strength (cylinder test compressive strength) of at least 140 $N/mm^2$ and/or a modulus of elasticity of at least 56,000 $N/mm^2$.

The ultra-high performance concrete according to the invention preferably has a modulus of elasticity of at least 55,000 $N/mm^2$, and preferably of 65,000 $N/mm^2$ or more.

The invention also pertains to a concrete structural component produced by centrifugal casting. As a result of the centrifugal forces in effect during the casting process, an especially high density or bulk density of the structure is achieved. The concrete structural component according to the invention is characterized in that it consists of ultra-high performance concrete of the type described and is produced from the concrete mix described. Because of its higher compressive strength, the concrete structural component according to the invention can be much more slender than conventional concrete components. The greater stiffness of the structural components results in reduced deformation under load.

The concrete structural component according to the invention can be configured preferably as a column or mast and comprise non-prestressed or prestressed steel reinforcement. Concrete structural components according to the invention which are produced by centrifugal casting are characterized by a smaller proportion of steel reinforcement in comparison to conventional concrete components, especially masts or columns; furthermore, the comparatively cheap ultra-high performance concrete according to the invention, the cost of which is comparable to that of normal concrete, is used for their production. The invention thus makes it possible to produce especially slender masts and columns out of ultra-high performance concrete by centrifugal casting without leading to higher costs.

The invention is explained below on the basis of an exemplary embodiment with reference to the drawings:

DETAILED DESCRIPTION OF THE INVENTION

Figure 1:
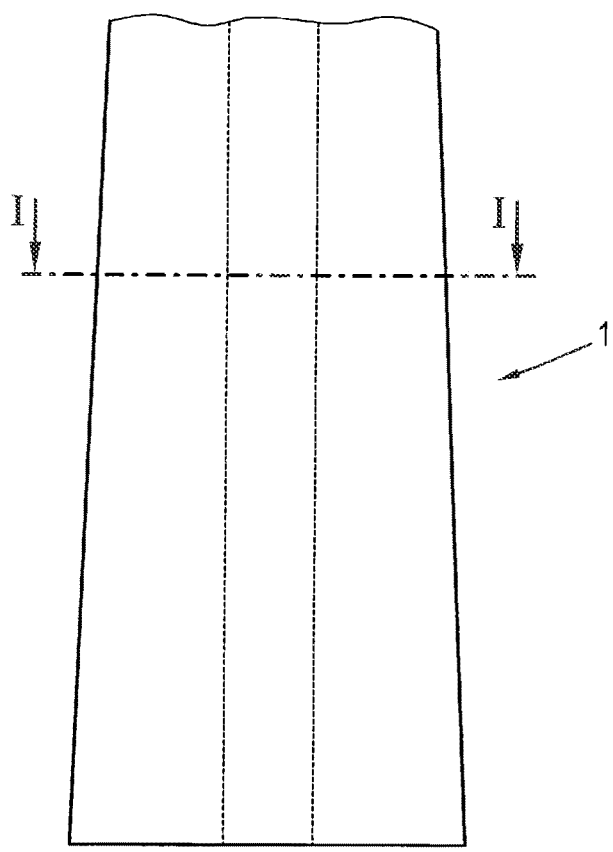
FIG. 1 shows a side view of a concrete structural component according to the invention configured as a column.

FIG. 1 shows a column 1, which has been produced by centrifugal casting from an ultra-high performance concrete. In the cross-sectional view of FIG. 2, it can be seen that the column 1 comprises a helical reinforcement 2 and a number of prestressed reinforcing bars 3, 4 arranged in the longitudinal direction. In the exemplary embodiment shown here, the diameter of the reinforcing bars 3 is twice as large as the diameter of the reinforcing bars 4; the reinforcing bars 3, 4 alternate with each other. This exemplary embodiment, however, is not to be understood as a limitation, because the exact dimensions of the reinforcing bars will be determined within the scope of the engineering design process. In the interior of the column 1 there is a cavity 5, which is formed during the centrifugal casting process.

Figure 2:
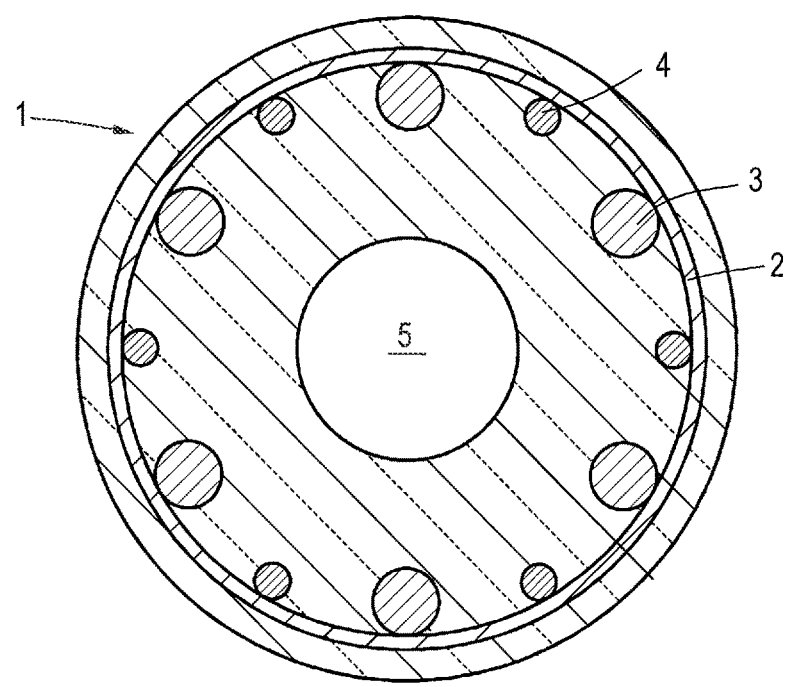
FIG. 2 shows a cross section through the column shown in FIG. 1.

In the exemplary embodiment shown in FIGS. 1 and 2, only about 80 kg of steel per meter is required, whereas a conventional column of the same load-bearing strength requires nearly 400 kg of steel per meter.

In the ultra-high performance concrete used for this exemplary embodiment, one cubic meter has the following composition:

550 kg of cement (Portland cement),
140 kg of water,
700 kg of sand,
1,000 kg of crushed basalt as aggregate,
80 kg of microsilica powder, and
120 kg of quartz powder.

The crushed basalt used in this example is an igneous rock and belongs to the volcanic group. A small amount of liquefier can also be included as an additive. The ultra-high performance concrete prepared according to this mix formula can be easily processed, because it is less sticky and can be introduced easily into the centrifugal casting form. The form, furthermore, can be easily removed from the cured concrete component, because the concrete does not stick to the form, as is frequently observed in the case of conventional UHPC concrete mixes. The concrete according to the invention is characterized by a soft consistency of the fresh concrete, which facilitates processing, especially the introduction into the centrifugal casting form. The flowable concrete fills even the small intermediate spaces around the reinforcing elements. After the centrifugal casting process, during which high centrifugal forces are used to bring about the desired high density, the still uncured concrete comprises a high uncured strength, that is, it retains the geometric form which it has acquired during the centrifugal casting process and does not slump down the form.

The compressive strength of the ultra-high performance concrete produced from the mix described above is at least 140 N/mm$^2$, and the modulus of elasticity is at least 55,000 N/mm$^2$. The ultra-high performance concrete described in this exemplary embodiment requires no expensive chemical additives; instead, a considerable proportion of crushed basalt is used as the aggregate, which is available practically everywhere, which means that the ultra-high performance concrete can be produced at low cost.

The high strength resulting from the centrifugal casting process is attributable to the fact that small cavities between the components of the as-yet uncured concrete are filled by finer material, especially by the crushed basalt, so that a high density is obtained. The column according to the invention is characterized by good fire resistance properties, because no physically bound water is present. Concrete structural components produced from the ultra-high performance concrete have a life-span of at least 150 years in the conventional exposure classes.

The invention claimed is:

1. A concrete structural component produced by a centrifugal casting process, the concrete structural component comprising an ultra-high performance concrete consisting essentially of Portland cement, aggregate, water, sand, microsilica, and quartz, wherein each cubic meter of the ultra-high performance concrete includes 450-650 kg of the Portland cement, 800-1,300 kg of the aggregate, 120-160 kg of the water, 500-1,000 kg of sand, 60-100 kg of microsilica powder, and 50-200 kg of quartz powder, and wherein the aggregate comprises an igneous rock in the form of crushed stone.

2. A concrete structural component according to claim 1, wherein the concrete structural component is configured as a column or mast and comprises non-prestressed or pretensioned steel reinforcement.

3. A concrete structural component according to claim 1, wherein one cubic meter of the ultra-high performance concrete further consists of 0.5-2.5 kg of polypropylene microfibers.

4. A concrete structural component according to claim 1, wherein the ultra-high performance concrete has a compressive strength of at least 140 N/mm$^2$.

5. A concrete structural component according to claim 1, wherein the ultra-high performance concrete has a modulus of elasticity of at least 55,000 N/mm$^2$.

6. A concrete structural component according to claim 1, wherein the ultra-high performance concrete has a modulus of elasticity of 65,000 N/mm$^2$.

7. A concrete structural component according to claim 1, wherein the ultra-high performance concrete has a density of 2.6-2.7 tons/m$^3$.

8. A concrete structural component according to claim 1, wherein the ultra-high performance concrete has a density of approximately 2.65 tons/m$^3$.

9. A concrete structural component according to claim 1, wherein the igneous rock comprises volcanic rock.

10. A concrete structural component according to claim 1, wherein the igneous rock comprises at least one of basalt, andesite, and trachyte.

11. A concrete structural component according to claim 1, wherein the igneous rock comprises abyssal rock (plutonite).

12. A concrete structural component according to claim 1, wherein the igneous rock comprises at least one of granite, diorite, and syenite.

13. A concrete structural component according to claim 1, wherein one cubic meter of the ultra-high performance concrete further consists of liquifiers of less than 5% by weight.

14. A concrete structural component according to claim 3, wherein one cubic meter of the ultra-high performance concrete further consists of liquifiers of less than 5% by weight.

15. A concrete structural component according to claim 1, wherein the crushed stone has a grain size of 0-8 mm.

\* \* \* \* \*